June 21, 1932.                R. STRESAU                    1,864,156
      METHOD OF MANUFACTURING THICK WALLED PRESSURE
              VESSELS BY ELECTRICAL WELDING
                   Filed Feb. 12, 1929
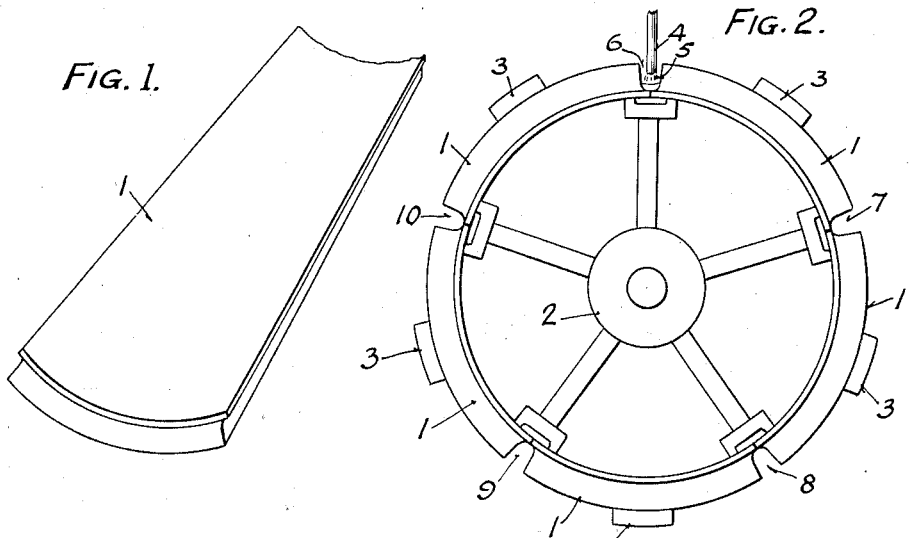
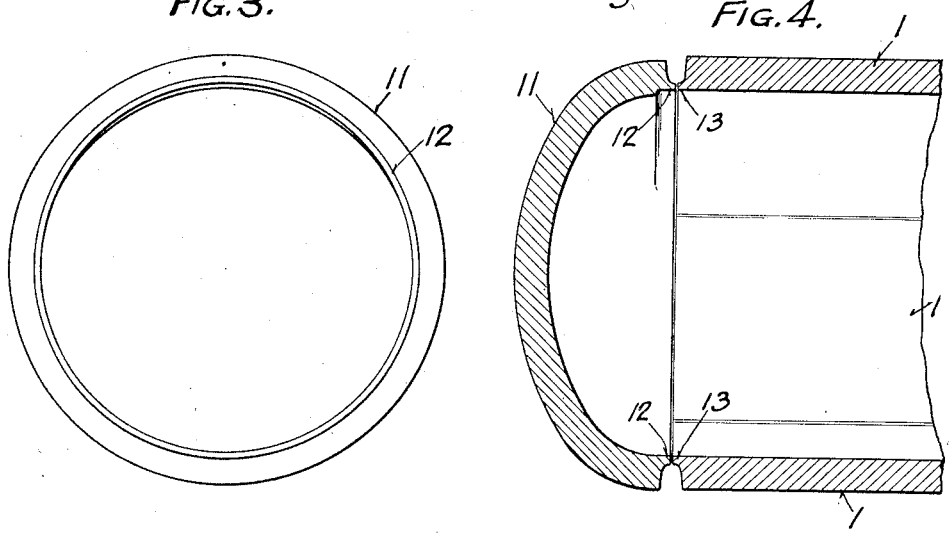
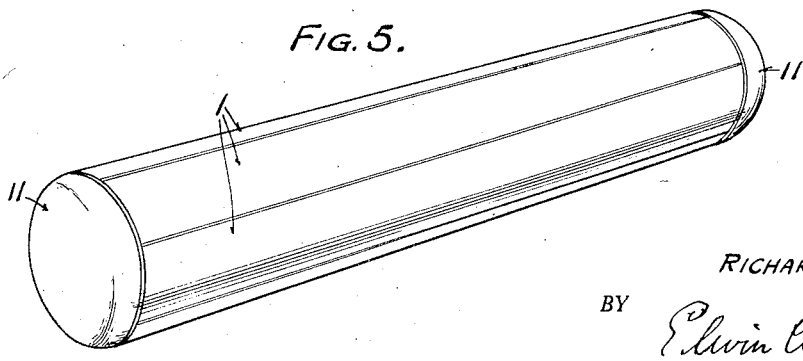
INVENTOR.
RICHARD STRESAU
BY
ATTORNEY.

Patented June 21, 1932

1,864,156

UNITED STATES PATENT OFFICE

RICHARD STRESAU, OF WAUWATOSA, WISCONSIN, ASSIGNOR TO A. O. SMITH CORPORATION, OF MILWAUKEE, WISCONSIN, A CORPORATION OF NEW YORK

METHOD OF MANUFACTURING THICK WALLED PRESSURE VESSELS BY ELECTRICAL WELDING

Application filed February 12, 1929. Serial No. 339,292.

This invention relates to electrical welding of thick walled pressure vessels, and certain features thereof have particular application to the manufacture of pressure vessels such as the one disclosed in Patent Reissue No. 16,865 to L. R. Smith.

The object of the invention is to provide a novel method whereby such a pressure vessel may be more readily and economically manufactured.

The invention will be more readily understood by reference to the accompanying drawing in which:

Figure 1 is a perspective view of a thick metal plate prepared for incorporation into the vessel.

Fig. 2 is an end elevation showing a plurality of such plates arranged preparatory to welding.

Fig. 3 is an end elevation of the head prepared for welding.

Fig. 4 is a central longitudinal section showing the head in position to be welded onto the ends of the plates.

Fig. 5 is a perspective view of the vessel.

In the manufacture of pressure vessels by forming a plurality of thick plates into curved segments and arranging the segments side by side in a circle to provide a tubular structure having a plurality of longitudinal seams to be welded, difficulty has been encountered in maintaining said plates in substantially circular arrangement during the welding operation so that the structure produced will have a truly circular contour. This is particularly true where the plates are of extreme thickness such as in the manufacture of high pressure vessels having a wall from 2 to 6 inches or more in thickness, as disclosed in the above identified patent.

The plates 1 may be chamfered while flat and then formed into curved segments by means of a pressing operation, or in any other suitable way. The segments are then arranged circumferentially on horizontally aligned spiders 2 and clamped in position thereon by any suitable means 3. The chamfered edges of the segments are parallel and meet to provide welding grooves in the respective seams for receiving deposited welding metal from a fusible weldrod 4 which is fused into said seams by means of an electric arc 5 established between the work and the weldrod.

In order to obtain a proper fusing and welding condition in any given welding groove, it is preferable to have said groove facing upwardly during the fusing operation. In the present invention the welding metal is fused into the top groove and then the spiders and plates are rotated to successively present the different grooves in position at the top for welding.

In the manufacture of the vessel it is preferable to employ five segments so as to provide five seams 6, 7, 8, 9 and 10, to be welded. After a layer of fusing welding metal has been deposited in groove 6, it is preferable to fuse metal into a groove as nearly opposite thereto as possible, such as either groove 8 or 9, since the stresses set up by the cooling of the deposited metal are in this way more uniformly distributed throughout the structure during the fabricating operation. By employing five plates and providing five longitudinal seams to be welded, a definite sequence may be maintained throughout the fabricating operation, the welding being successively applied to the different seams in the following order: 6, 9, 7, 10, 8, 6, 9, 7, 10, 8, etc. until the welding grooves are completely filled and the fabrication of the structure is finished.

If only four plates are employed and four longitudinal seams are provided for welding, the welding operation is ordinarily transferred from the first seam to the seam opposite thereto and then to a seam between the same, and the stresses set up by such a sequence have a greater tendency to deform the structure during welding.

It has been found that the peculiar advantage given by the five seam construction is present when 3, 5, 7, 9 or some larger odd number of seams is employed. By this method more uniform stress conditions are obtained and the finished tubular structure has a more truly circular contour.

In general, in welding in accordance with this disclosure, when the plates have been assembled on the spiders, they may be rotated to present the grooves defined by their chamfered edges in any desired order. In some instances, it may be desirable to rotate the spiders step-by-step in one direction to present the grooves in succession, while in other cases the grooves may be presented in some predetermined order to meet welding conditions.

The manner in which the weld metal is deposited in the grooves will depend upon the thickness of the plates and the results it is desired to obtain. Good results may be obtained by depositing the weld metal in layers. If desired, the weld metal may be deposited in layers in the grooves successively as they are presented at the top for welding operations and layer after layer of metal deposited in the order in which the grooves are presented until the grooves are completely filled with weld metal.

When an end head 11 is welded to the end of such tubular structure, as shown in Fig. 3, certain other difficulties arise. The head is preferably elliptical and may be formed from a flat plate by spinning, pressing, or other suitable means. It has been found difficult to form the head so that the edges thereof are truly circular. Consequently, if the edges are chamfered prior to the forming operation, the lips 12 at the inner circumference of the edges may not be truly circular and may not properly align with the lips 13 formed at the end of the tubular structure to provide a welding groove.

This difficulty may be overcome by forming the head prior to the chamfering operation and then chamfering the edge by a tool travelling in a truly circular path. In this way the outer edge of the lip will be truly circular and will properly align with the lips provided on the end of the tubular structure irrespective of slight irregularities in the contour of the head.

However, since the edge of the head is not truly circular, the inner edge of the lips 12 may be untrue causing a variation in thickness of the lips. In order to eliminate this, it is preferable to chamfer the inner side of the lips to cut the same to a true circular contour and thereby provide a lip of uniform thickness. It is also preferable to form the lips 13 in a similar manner after the tubular structure is fabricated to insure a perfect alignment of lips 12 and 13.

The welding operation is preferably performed in the manner disclosed and claimed in my copending application, Serial No. 339,293, filed on even date herewith.

The lips 12 and 13 are preferably formed at or near the inner circumference of the edges to provide the main welding groove substantially on the outer circumference of the vessel.

Having thus described the invention in detail, I claim the various novel characteristics thereof as follows:

1. The method of manufacturing excessively thick walled tubular structures, which comprises forming an odd number, not less than three, of thick metal plates into curved segments, arranging said segments in a circle and providing longitudinal welding grooves therebetween, fusing welding metal into one of said welding grooves to form a layer of deposited metal therein, fusing welding metal into a groove nearly opposite to said last specified groove to form a layer of deposited metal therein, successively fusing metal into nearly opposite non-fused grooves until all of the grooves have deposited metal fused therein, and repeating said fusing operation in similar sequence until the plates are welded into an integral tubular structure.

2. In the manufacture of tubular structures, the steps comprising forming a number of thick metal plates into curved segments of equal radii, arranging said segments in a horizontal cylindrical formation and providing welding grooves longitudinally therebetween with one of said grooves positioned at the top of the structure, fusing welding metal into said top groove to partially fill the same, then rotating the structure successively to position other welding grooves at the top for welding and fusing welding metal successively into said grooves to partially fill the same, and repeating similar successive welding operations in all of said grooves until the same are filled with successive layers of deposited weld metal.

3. In the manufacture of tubular structures, the steps comprising forming a number, not less than five, of metal plates into curved segments of equal radii, arranging said segments in a cylindrical formation and providing welding grooves longitudinally therebetween with one of said grooves positioned at the top of the structure, fusing welding metal into said top groove to weld the plates adjacent thereto together, then rotating the structure to position a groove nearly opposite to said last specified groove at the top for welding and fusing welding metal into said second specified groove to weld the plates adjacent thereto together, and continuing the successive operations of rotating the structure and fusing weld metal into the respective grooves in similar sequence, passing from the groove last welded to one nearly opposite thereto, until all of said grooves are welded and an integral tubular structure is produced.

4. In the manufacture of tubular structures, the steps comprising forming a number, not less than three, of thick metal plates into curved segments of equal radii, arranging said segments in a horizontal cylindrical formation and providing welding grooves longitudinally therebetween with one of said grooves positioned at the top of the structure, fusing welding metal into said top groove to partially fill the same, then rotating the structure successively to position each of the other welding grooves at the top for welding and fusing welding metal successively into each of said grooves to partially fill the same, and then repeating similar successive welding operations until all of said grooves are filled with successive layers of deposited weld metal.

5. The method of manufacturing thick-walled tubular structures, which comprises forming not less than three metal plates into complementary curved segments of equal radii, arranging said segments in a horizontal cylindrical formation and providing welding grooves longitudinally therebetween with one of said grooves positioned at the top of the structure for welding, fusing welding metal into said top groove to partially fill the same, then rotating the structure to position a groove nearly opposite to said last specified groove at the top for welding and fusing welding metal into said second specified groove to partially fill the same, successively rotating the structure and fusing metal into nearly opposite non-fused grooves until all of the grooves are partially filled with weld metal, and repeating said rotating and fusing operations in similar sequence until the plates are welded into an integral welding structure and the welding grooves are filled with welding metal.

In testimony whereof I have signed my name at Milwaukee, Wisconsin, this 8th day of February, 1929.

RICHARD STRESAU.